US012623307B2

(12) United States Patent
Narayanan et al.

(10) Patent No.: US 12,623,307 B2
(45) Date of Patent: May 12, 2026

(54) WELDING ELECTRODE WITH FUNCTIONAL COATINGS

(71) Applicant: Lincoln Global, Inc., Santa Fe Springs, CA (US)

(72) Inventors: Badri Narayanan, Highland Heights, OH (US); Vivek Sengupta, Toronto (CA); David B. Russell, Madison, OH (US); Stephen Farah, Broadview Heights, OH (US); Yijian Zhou, North York (CA)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 682 days.

(21) Appl. No.: 17/930,993

(22) Filed: Sep. 9, 2022

(65) Prior Publication Data

US 2023/0089614 A1    Mar. 23, 2023

Related U.S. Application Data

(60) Provisional application No. 63/261,462, filed on Sep. 21, 2021.

(51) Int. Cl.
| | |
|---|---|
| *B23K 35/02* | (2006.01) |
| *B23K 35/24* | (2006.01) |
| *B23K 35/30* | (2006.01) |

(52) U.S. Cl.
CPC .......... *B23K 35/0261* (2013.01); *B23K 35/24* (2013.01); *B23K 35/3053* (2013.01)

(58) Field of Classification Search
CPC .............................................. B23K 35/0272
See application file for complete search history.

(56) References Cited

U.S. PATENT DOCUMENTS

| | | | |
|---|---|---|---|
| 1,967,872 | A | 7/1934 | Doan |
| 2,909,648 | A | 10/1959 | Landis et al. |
| | | (Continued) | |

FOREIGN PATENT DOCUMENTS

| | | |
|---|---|---|
| CN | 104907738 A | 9/2015 |
| CN | 106862793 A | 6/2017 |
| | (Continued) | |

OTHER PUBLICATIONS

Extended European Search Report for Corresponding European Application No. 22196964.5; Dated Feb. 3, 2023; pp. 1-10.

(Continued)

*Primary Examiner* — Alexandra M Moore
(74) *Attorney, Agent, or Firm* — Knobbe Martens

(57) ABSTRACT

The disclosed technology generally relates welding electrodes, and more particularly to consumable welding electrodes having functional coatings. In one aspect, a welding electrode comprises a core wire having a base metal composition and two or more coatings covering at least a portion of the core wire. The two or more coatings comprise an electrically conductive coating including one or more electrically conducting elements or compounds in addition to or other than copper (Cu). The two or more coatings additionally comprises an additional functional coating including one or more additional elements or compounds adapted to modify a surface tension of a molten droplet formed from the welding electrode. In another aspect, a method of manufacturing a welding electrode comprises providing the core wire having the base metal composition and forming the two or more coating layers.

19 Claims, 6 Drawing Sheets

500

510 — provide a core wire having a base metal composition

520 — condition the surface of the core wire

530 — form one of a first coating comprising an electrically conducting material including one or more electrically conducting elements or compounds in addition to or other than copper (Cu) and a second coating comprising an additional functional material 540 — post-condition the surface of the one of the first coating and the second coating 550 — form the other of the first coating and the second coating 560 — post-condition the surface of the other of the first coating and the second coating

(56)                    References Cited

U.S. PATENT DOCUMENTS

| | | | |
|---|---|---|---|
| 2,909,778 A | 10/1959 | Landis et al. | |
| 3,438,755 A | 4/1969 | Millhoff | |
| 3,574,678 A | 4/1971 | Stark | |
| 3,691,340 A * | 9/1972 | Landis | B23K 35/22 |
| | | | 219/137 WM |
| 3,783,234 A | 1/1974 | Russell | |
| 4,345,140 A * | 8/1982 | Godai | B23K 35/3086 |
| | | | 148/26 |
| 4,804,818 A | 2/1989 | Andersen | |
| 4,913,927 A | 4/1990 | Anderson | |
| 5,411,611 A | 5/1995 | Kumar et al. | |
| 5,575,933 A | 11/1996 | Ni | |
| 6,608,284 B1 | 8/2003 | Nikodym | |
| 6,787,736 B1 | 9/2004 | Chen et al. | |
| 6,933,468 B2 | 8/2005 | Keegan et al. | |
| 8,158,907 B2 | 4/2012 | Nikodym | |
| 8,256,085 B2 | 9/2012 | Nelson et al. | |
| 8,952,295 B2 | 2/2015 | Schaeffer et al. | |
| 10,519,562 B2 | 12/2019 | Hou et al. | |
| 10,702,953 B2 | 7/2020 | Goncharov et al. | |
| 2009/0314756 A1 | 12/2009 | Shaeffer et al. | |
| 2011/0168677 A1 | 7/2011 | Hornaes | |
| 2019/0308281 A1 | 10/2019 | Craciun | |
| 2023/0415276 A1 | 12/2023 | Narayanan et al. | |

FOREIGN PATENT DOCUMENTS

| | | | | |
|---|---|---|---|---|
| CN | 112440026 A | 3/2021 | | |
| EP | 1155769 A2 * | 11/2001 | ......... | B23K 35/3053 |
| EP | 3 206 832 B1 | 8/2020 | | |
| EP | 3 689 532 A1 | 8/2020 | | |
| FR | 2125353 A1 | 9/1972 | | |
| GB | 1 571 136 | 7/1980 | | |
| JP | H06-36998 B2 | 5/1994 | | |
| JP | 3753173 B2 | 3/2006 | | |
| WO | WO 2011/152341 A1 | 12/2011 | | |
| WO | WO 2018/033862 A1 | 2/2018 | | |

OTHER PUBLICATIONS

International Search Report and Written Opinion received for PCT Application No. PCT/US2023/032143 as mailed Feb. 12, 2024 in 21 pages.

Goode et al., "Innovative, Hybrid™ Functional Coatings for Aluminum and Titanium Substrates", NASF Surface Technology White Papers, 83 (5), 1-7 (Feb. 2019).

Padilla et al., "A Mathematical Model of Wire Feeding Mechanisms in GMAW", Welding Research, Welding Journal, pp. 100-S-109-S, May 2003.

* cited by examiner

100

400A 308B
308A      304

308

400B 308C
308B  308A
      304

308

500

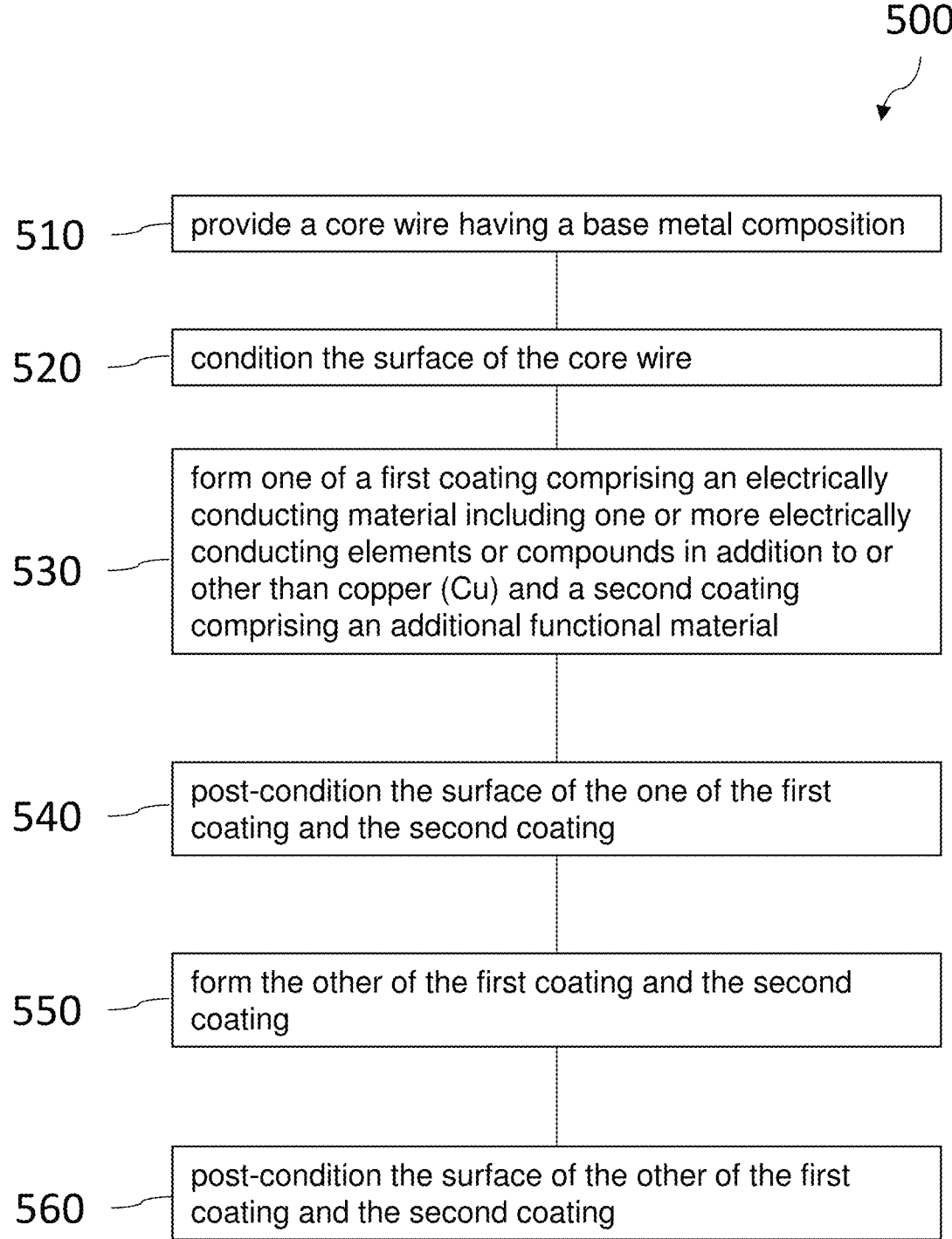

510 — provide a core wire having a base metal composition

520 — condition the surface of the core wire

530 — form one of a first coating comprising an electrically conducting material including one or more electrically conducting elements or compounds in addition to or other than copper (Cu) and a second coating comprising an additional functional material 540 — post-condition the surface of the one of the first coating and the second coating 550 — form the other of the first coating and the second coating 560 — post-condition the surface of the other of the first coating and the second coating

FIG. 5

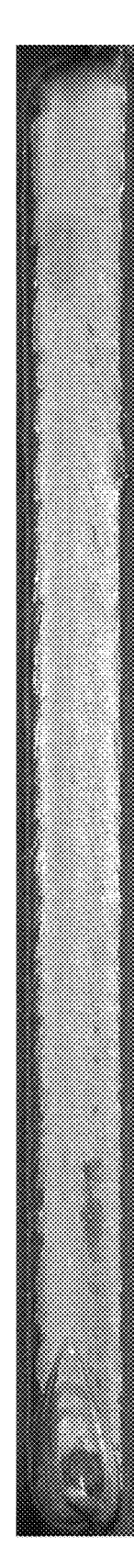
FIG. 6A
FIG. 6B

WELDING ELECTRODE WITH FUNCTIONAL COATINGS

CROSS-REFERENCE TO RELATED APPLICATION

This application claims the benefit of U.S. Provisional Application No. 63/261,462, entitled "WELDING ELECTRODE WITH FUNCTIONAL COATINGS," filed Sep. 21, 2021, the content of which is hereby incorporated by reference in its entirety.

BACKGROUND

Field

The disclosed technology generally relates welding electrodes, and more particularly to consumable welding electrodes having functional coatings on core wires.

Description of the Related Art

Various welding technologies utilize consumable welding electrodes that serves as a source of the weld metal. For example, in metal arc welding, an electric arc is created when a voltage is applied between a consumable weld electrode, which serves as one electrode that advances towards a workpiece, and the workpiece, which serves as another electrode. The arc melts a tip of the metal wire, thereby producing droplets of the molten metal electrode that deposit onto the workpiece to form a weld metal or weld bead.

Technological and economic demands on welding technologies continue to grow in complexity, with the need for higher manufacturing flexibility and the need for higher mechanical performance coexisting. In addition, optimization of one performance parameter of the weld metal can compromise another. Some welding technologies aim to address these competing demands by improving the consumables, e.g. by improving the physical designs and/or compositions of the consumable electrodes. The disclosed technology addresses a need for improved consumable welding electrodes having functional coatings.

SUMMARY

In a first aspect, a welding electrode comprises a solid core wire having an iron (Fe)-based base metal composition and an electrically conductive coating formed on the solid core wire. The electrically conductive coating includes one or more electrically conducting elements or compounds in addition to or other than copper (Cu). The welding electrode additionally comprises an additional functional coating formed on the electrically conductive coating and including one or both of elemental antimony (Sb) and one or more Sb oxides.

In a second aspect, a welding electrode comprises a solid core wire having an iron (Fe)-based base metal composition and two or more coatings covering at least a portion of the core wire. The two or more coatings comprise an electrically conductive coating formed on the solid core wire including one or more electrically conducting elements or compounds in addition to or other than copper (Cu). The two or more coatings additionally comprise an additional functional coating having a porous structure formed on the electrically conductive coating and including antimony (Sb).

BRIEF DESCRIPTION OF THE DRAWINGS

FIG. 5 illustrates a method of fabricating a covered welding consumable electrode, according to embodiments.

FIG. 6A illustrates a weld metal formed using a conventional consumable electrode.

FIG. 6B illustrates a weld metal formed using a consumable electrode having functional coatings according to embodiments.

DETAILED DESCRIPTION

Some welding electrodes have two main components: a core wire or a rod and a covering or coating. The core includes base alloying elements of the weld metal. The coating can include various materials that serve various functionalities. For example, the coating can serve to provide, among other things: shielding of the weld metal, stabilization of the arc, alloying elements for the weld metal for various physical properties, slag for fluxing, reduction of gas pockets in the weld metal, increased electrical conductivity or insulation, protection from the environment, lubrication for feeding and attractive appearance, to name a few.

Some traditional solid welding wires are coated with a coating comprising copper on the surface of the wires to enhance the electrical conductivity and corrosion resistance of the wire and the welding nozzle, and to reduce the friction with the feeding hose or the welding nozzle. However, during the welding process, some of the copper can undesirably melt into the weld. The copper contamination of the weld can cause "copper cracking" or reduce the mechanical properties of the weld joints, especially the impact toughness and elongation at low temperature. The copper also oxidizes into copper particles and escapes into the air, which is harmful to human health when inhaled. The production of copper-coated welding wire can also produce waste acid and pollution into the environment. Thus, there is a need for a coated wire which at least reduces or eliminates copper from the coating of the welding electrodes while preserving the functional benefits thereof.

To address these and other needs, embodiments disclosed herein relate to a welding electrode comprises a core wire having a base metal composition and two or more coatings covering at least a portion of the core wire. The two or more coatings comprise an electrically conductive coating including one or more electrically conducting elements or compounds in addition to or other than copper (Cu). The two or more coatings additionally comprises an additional functional coating including one or more additional elements or compounds adapted to modify a surface tension of a molten droplet formed from the welding electrode (a molten weld metal surface tension modifier).

Arc Welding Processes for Welding with Electrodes having Functional Coating

Arc welding is one of several fusion processes for joining metals. By applying intense heat, metal at the joint between two parts is melted and caused to intermix-directly, or more commonly, with an intermediate molten filler metal.

Figure 1:
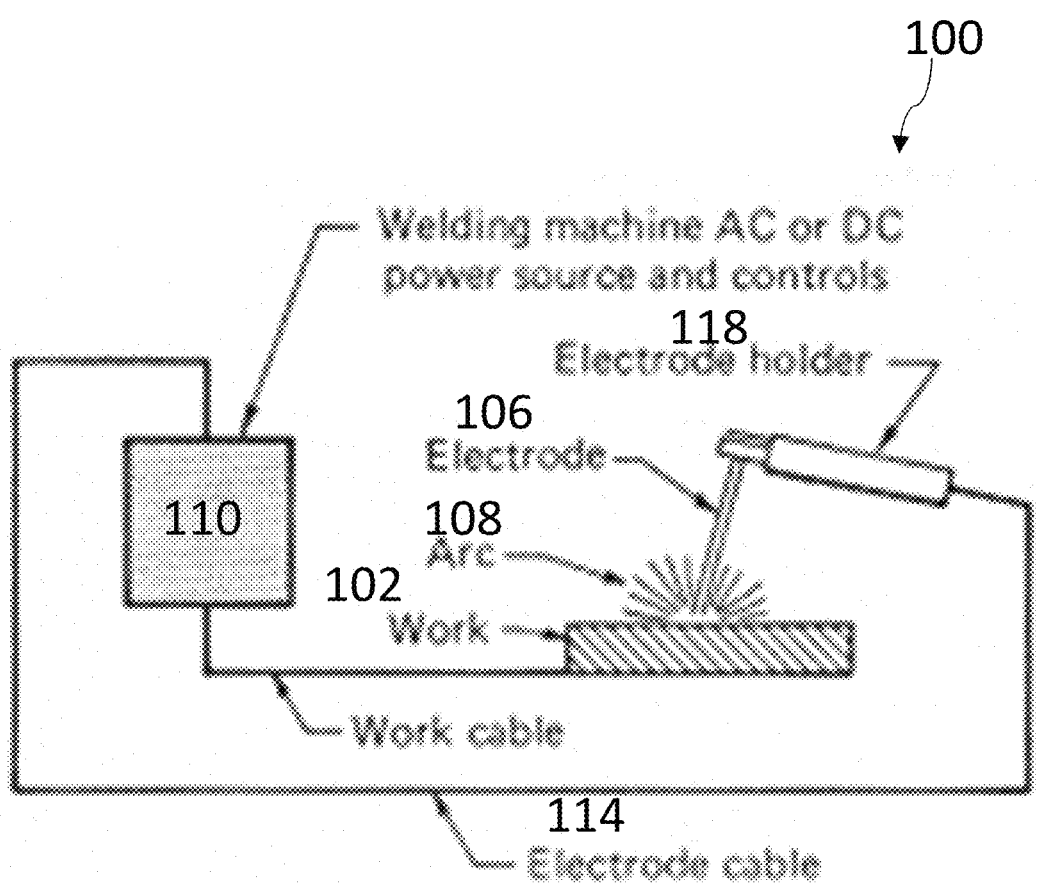
FIG. 1 illustrates an arc welding system that can be used in conjunction with consumable electrodes according to embodiments disclosed herein.

A arc-welding system 100 that can be used in conjunction with embodiments disclosed herein is illustrated in FIG. 1. A power source system 110 including AC or DC power source and controls, is connected by a work cable 114 to a workpiece 102 to be welded and by a "hot" cable to an electrode holder 118, which makes an electrical contact with the welding electrode 106. An arc is created across a gap between the workpiece 102 and the welding electrode 106 when the energized circuit and the electrode tip touches the workpiece 102 and is withdrawn, yet still with in close contact. The electric arc may be created between the welding electrode 106, which may be a consumable electrode, which serves as one electrode (e.g., anode (+) in DC), and the workpiece 102, which serves as another electrode (e.g., cathode (−) in DC). After initiation of the arc, a plasma 108 is sustained, which contains neutral and ionized gas molecules, as well as neutral and charged clusters or droplets of the material of the metal wire that have been vaporized by the arc. The welding electrode 106 advances towards the work piece 102, and the molten droplets of the metal wire deposits onto the workpiece, thereby forming a weld bead or weld metal. The arc can produce a temperature as high as about 6500° F. at the tip. This heat melts both the workpiece 102 and the welding electrode 106, producing a pool of molten metal sometimes called a "crater." The crater solidifies behind the electrode as it is moved along the joint. Upon cooling and solidification, a metallurgical bond is created. Since the joining is an intermixture of metals, the final weldment can have comparable or substantially the same mechanical properties, e.g., strength, as the metal of the parts of the workpiece 102. This is in notable contrast to non-fusion processes of joining (e.g., soldering, brazing, etc.) in which the mechanical and physical properties of the base materials may not be comparable to the workpiece 102 at the joint.

Metals at high temperatures tend to react chemically with elements in the air—oxygen and nitrogen. When the metal in the molten pool comes into contact with air, oxides and nitrides may form, which can negatively affect the strength and toughness of the weld joint. Therefore, some arc-welding processes provide some means of covering the arc and the molten pool with a protective shield of gas, vapor, and/or slag. This is called arc shielding. This shielding reduces or minimizes contact of the molten metal with air. Shielding also may improve the weld. An example is a flux, which can include deoxidizers for the weld metal.

In welding, the arc not only provides the heat needed to melt the electrode and the base metal, but under certain conditions must also supply the means to transport the molten metal from the tip of the electrode to the work. Several mechanisms for metal transfer exist. Examples include a surface tension transfer in which a drop of molten metal touches the molten metal pool and is drawn into it by surface tension, and a spray arc in which the drop is ejected from the molten metal at the electrode tip by an electric pinch propelling it to the molten pool.

When the electrode 106 is a consumable electrode as disclosed herein, the tip melts under the heat of the arc and molten droplets are detached and transported to the work piece 102 through the arc column. Arc welding in which an electrode according to embodiments described herein is melted off to become part of the weld is described as metal-arc welding. This is in contrast to carbon or tungsten (TIG) welding, in which there are no molten droplets to be forced across the gap and onto the work. Filler metal is melted into the joint from a separate rod or wire. More of the heat developed by the arc is transferred to the weld pool with consumable electrodes. This produces higher thermal efficiencies and narrower heat-affected zones.

Arc welding may be performed with direct current (DC) with the electrode either positive (DCEP) or negative (DCEN) or alternating current (AC). The choice of current and polarity depends on the process, the type of electrode, the arc atmosphere, and the metal being welded.

In processes using a consumable electrode, the electrode or the wire melts to provide an additive metal that fills a gap to form a weld joint that joins two metal workpieces. The welding processes using consumable electrodes include shielded metal arc welding (SMAW), gas metal arc welding (GMAW) or metal inert gas (MIG) welding, flux-cored arc welding (FCAW), metal-cored arc welding (MCAW), and submerged arc welding (SAW), among others. The welding processes using consumable welding electrodes can be carried out in direct current electrode positive (DCEP) mode, direct current electrode negative (DCEN) mode, or alternating current (AC) mode. In a DCEP mode, a direct current is used and the wire is connected to the positive terminal of the power source and the workpiece(s) or plate(s) to be welded is connected to the negative terminal, and vice versa when welding in a DCEN mode. In an AC mode, the wire and the workpiece(s) or plate(s) switches from positive to negative in cycles depending on a frequency. The terminal that serves as a positive electrode may be referred to as an anode and the terminal that serves as a negative electrode may be referred to as a cathode. In the following, various consumable electrode-based welding processes that can be implemented with oxide-coated welding wires according to embodiments are described.

Figure 2:
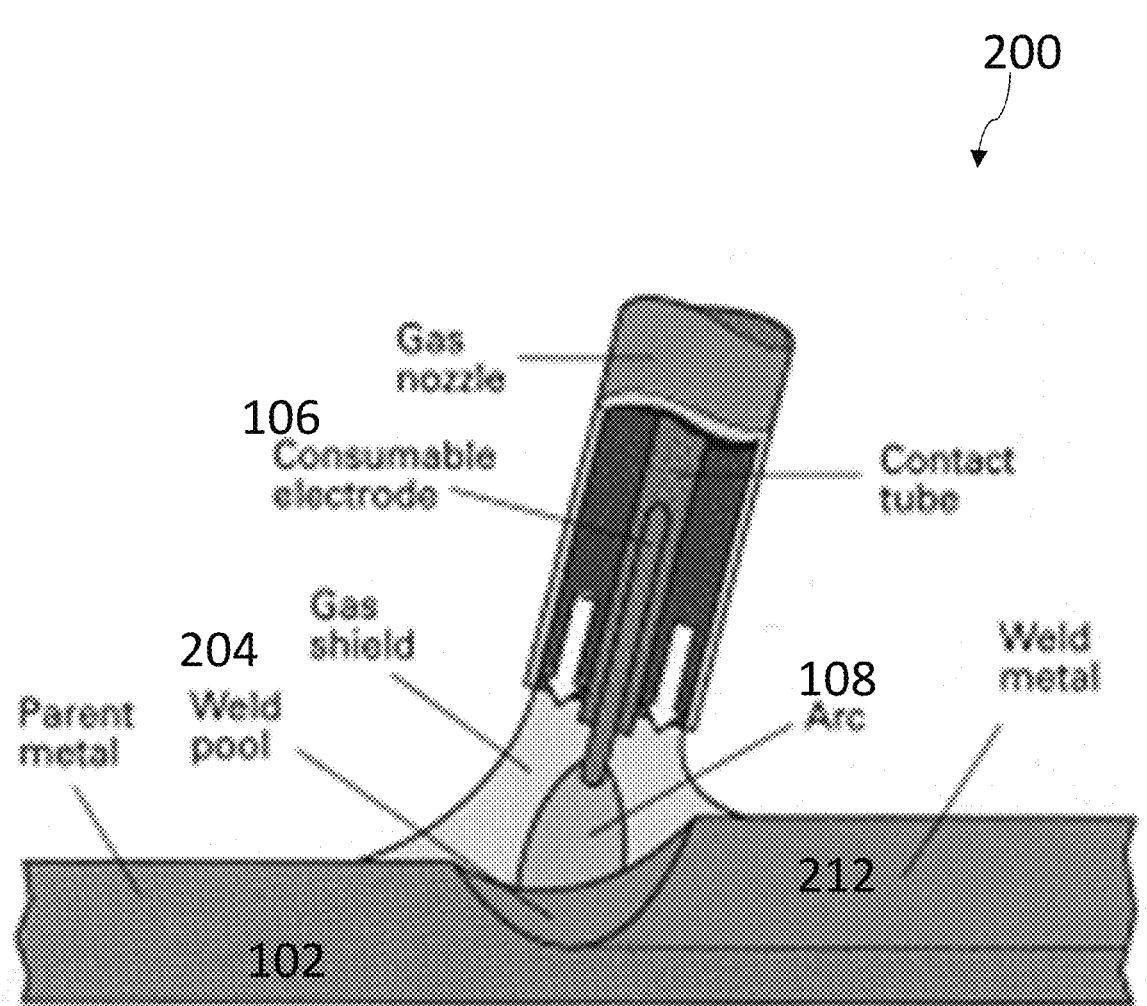
FIG. 2 illustrates a process of welding using a consumable electrode according to embodiments disclosed herein.

FIG. 2 illustrates a gas metal arc welding (GMAW) process 200, sometimes referred to as metal inert gas (MIG) welding process, which can be used in conjunction with embodiments disclosed herein. The GMAW process uses a continuous solid wire electrode 106 for filler metal and an externally supplied gas (typically from a high-pressure cylinder) for shielding. The electrode 106 can be a mild steel, and can be coated with a thin layer of coating according to various embodiments, which can include two or more coatings comprising an electrically conductive coating and an additional functional coating adapted to modify a surface tension of a molten droplet formed from the welding electrode (a molten weld metal surface tension modifier). When an arc 108 is struck between the electrode 106 and the workpiece 102, both the electrode 106 and the surface of the workpiece 102 evaporate to form globules of metal that is transferred to the surface of the workpiece 102, thereby forming a weld pool 204 including the metal of the covered electrode 106 and the metal of the workpiece 102. The welding machine can be setup for DC positive polarity. The shielding gas, which is usually carbon dioxide or mixtures of carbon dioxide and argon, protects the molten metal from the atmosphere. Shielding gas flows through the gun and cable assembly and out the gun nozzle with the welding wire to shield and protect the molten weld pool. Molten metal can be very reactive to oxygen, nitrogen and hydrogen from the atmosphere, if exposed to it. According to various embodiments, a welding electrode configured for various welding processes described above, e.g., GMAW, comprises a core wire having a base metal composition and two or more coatings covering at least a portion of the core wire. As described herein, the two or more coatings comprise an electrically conductive coating including one or more electrically conducting elements or compounds in addition to or other than copper (Cu). The two or more coatings additionally comprises an additional functional coating. The additional functional coating includes one or more additional elements or compounds adapted to modify a surface tension of a molten droplet formed from the welding electrode.

Figure 3:
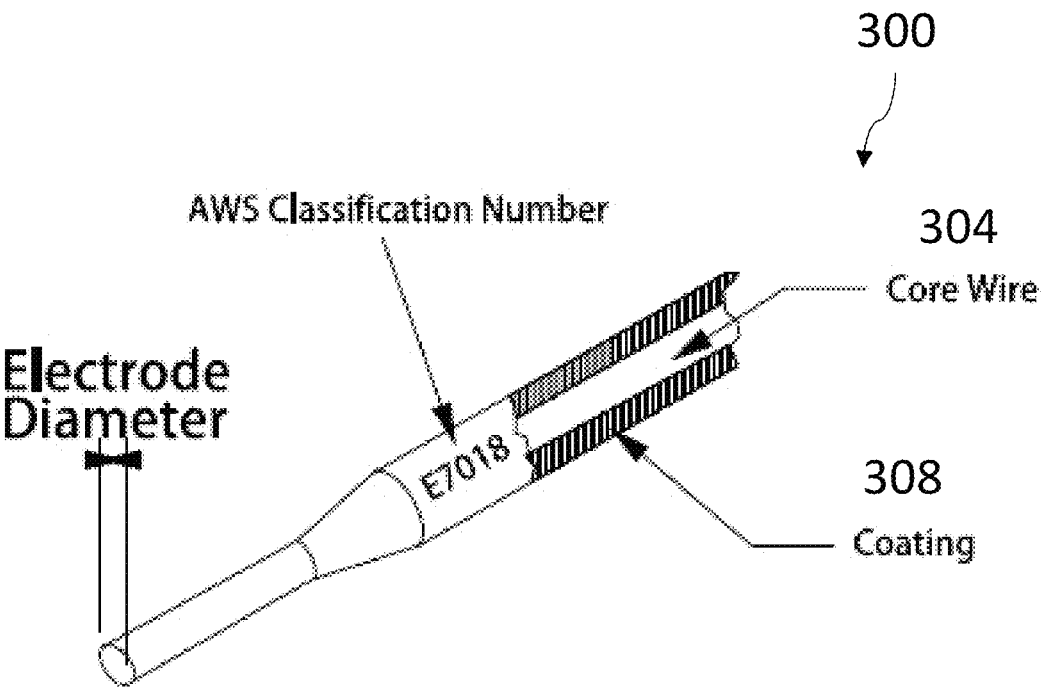
FIG. 3 illustrates a covered welding consumable electrode according to embodiments.

FIG. 3 illustrates a welding consumable electrode 300 according to various embodiments. The electrode 300 comprises a core wire 304 and a coating 308. The core wire 304 can include a suitable carbon steel, e.g., a mild steel for GMAW, which is coated with the coating 308 to provide alloying elements for the resulting weld metal, as well as various additional non-alloying functionalities, as described herein. The chemical elements and compounds of the core wire 304 and the coating 308 disclosed herein can be distinguished based on whether or not the constituent element is incorporated as part of the alloy of the weld metal. In the following, elements that are substantially incorporated into the resulting weld metal may be referred to as alloying elements, while elements that are substantially not incorporated into the resulting weld metal for rather serve other functions, such as slag or gas forming or arc-stabilizing, may be referred to as non-alloying elements.

Figure 4A:
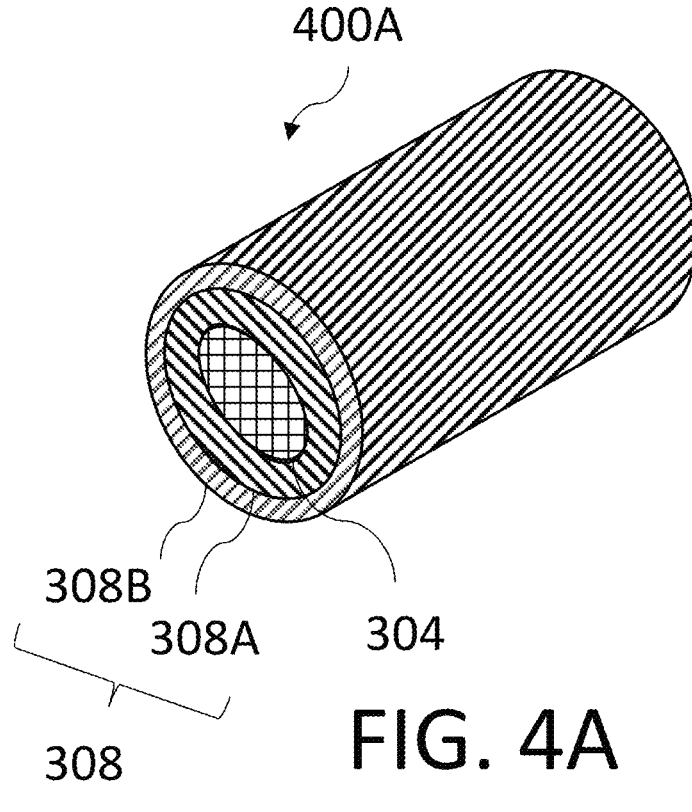
FIG. 4A illustrates a covered welding consumable electrode comprising two or more coatings, according to embodiments.
Figure 4B:
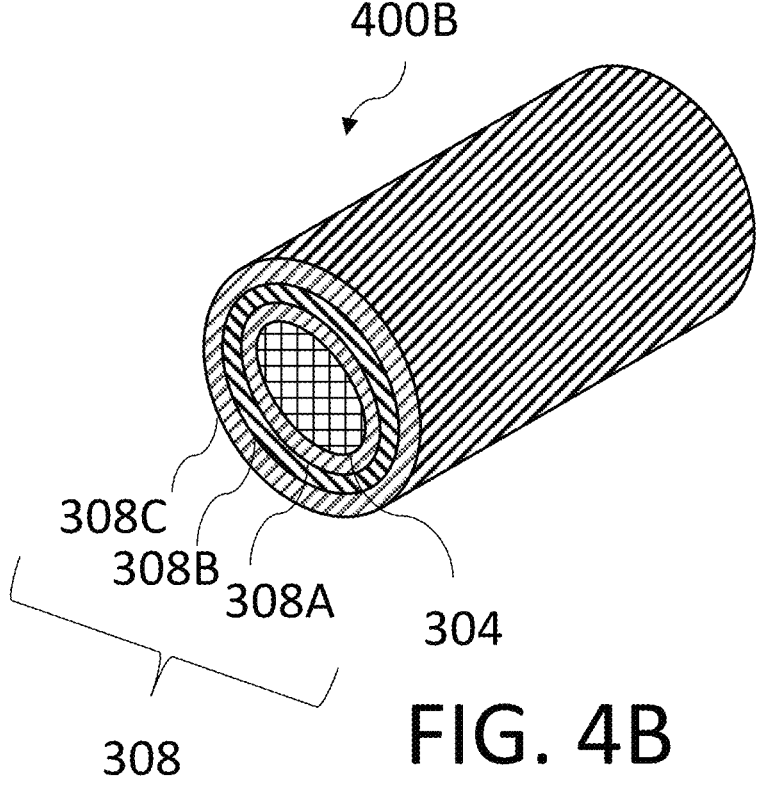
FIG. 4B illustrates a covered welding consumable electrode comprising three or more coatings, according to embodiments.

FIGS. 4A and 4B illustrate covered welding consumable electrodes 400A and 400B, respectively, according to some other embodiments. The electrodes 400A and 400B comprise a core wire 304 and a coating 308 and is configured in a similar manner as the electrode 300A illustrated in FIG. 3 except, the electrodes 400A and 400B comprise a plurality of coatings. By way of illustration, the electrode 400A comprises two coatings 308 including a first coating 308A and a second coating 308B. The electrode 400B comprises a plurality of coatings 308 comprising a first coating 308A, a second coating 308B and a third coating 308C. In addition, while not illustrated, the plurality of coatings according to other embodiments may include n coatings, including first to nth coatings.

As described above, a weld metal can include solidified metal of the work piece as well as the metal of the consumable electrode. Because the amount of dilution or concentration of elements in the weld metal due to incorporation of molten work piece can vary considerably, unless otherwise indicated, the weight percentages of various elements and compounds in the weld metal as disclosed herein refer to those of undiluted weld metals that would be obtained if no dilution or concentration would have occurred from the work piece.

Still referring to FIGS. 3 and 4A-4B, the core wire 304 includes a carbon steel composition, e.g., a mild steel composition. The carbon steel composition according to various embodiments includes Fe and one or more of C, Cr, Ni, Mo, V, Cu, Mn and Si at concentrations greater than impurity levels. In some embodiments, the core wire 304 includes a low alloy steel composition including about 1.5% to 5% alloying element content by weight. There may be additional elements that may be present at an impurity level. As described herein, an impurity level refers to a weight percentage of an element that is not intentionally introduced but is nevertheless present, which can be generally less than 0.05%. Impurities that are not intentionally added but nevertheless be present in the core wire 304 include S, P, Al, Cu, N, Cr, Ni, Mo, V, Nb and Ti. The balance of the weight of the core wire 304 can be Fe.

Still referring to FIGS. 4A-4B, the coating 308 includes an electrically conductive coating including one or more electrically conducting elements or compounds in addition to or other than copper (Cu) and an additional functional coating including one or more additional elements or compounds adapted to modify a surface tension of a molten droplet formed from the welding electrode. As described herein, any one of the first and second coatings 308A, 308B of the electrode 400A (FIG. 4A) or any one of the first, second and third coatings 308A, 308B and 308C of the electrode 400B (FIG. 4B) can be an electrically conductive layer or an additional functional layer, in any order. Thus, while an electrically conductive coating according to embodiments may be referred to as the first coating 308A of the electrodes 400A, 400B that is the innermost coating of the plurality of coatings 308, it will be understood that the electrically conductive coating may also be the second coating 308B of the electrodes 400A, 400B, or the third coating 308C of the electrode 400B. Similarly, while an additional functional coating according to embodiments maybe referred to as the first coating 308A of the electrodes 400A, 400B that is the innermost coating of the plurality of coatings 308, it will be understood that the additional functional coating may also be the second coating 308B of the electrodes 400A, 400B, or the third coating 308C of the electrode 400B.

Electrically Conductive Coating

According to various embodiments, any one of the first, second and third coatings 308A, 308B, 308C (FIGS. 4A or 4B) is an electrically conductive coating including one or more electrically conducting elements or compounds selected from the group consisting of magnesium (Mg), aluminum (Al), zinc (Zn), tin (Sn), chromium (Cr), platinum (Pt), silver (Ag), graphite, graphene, graphene oxide and titanium (Ti).

According to various embodiments, the electrically conductive coating serves to provide substantial electrical conductivity to the electrodes 400A, 400B such that a substantial amount (e.g., >10%, >30%, >50%, >70%, >90% or a value in a range defined by any of these values) of the current passed through the electrodes 400A and 400B during welding flows through the first coating 308A. In some embodiments, the one or more electrically conducting elements or compounds are present in an amount and form such that the welding electrodes 400A, 400B have a lower electrical resistance relative to the core wire 304 without the electrically conducting elements or compounds.

In some embodiments, the one or more electrically conducting elements or compounds are present without Cu as part of the electrically conductive coating or as part of any of the plurality of coatings 308. That is, in some embodiments, the one or more electrically conducting elements or compounds may obviate a need to use Cu as part of a coating, e.g., for providing the requisite electrical conductivity, and Cu may be omitted from the plurality of coatings 308. In some other embodiments, the one or more electrically conducting elements or compounds are present in addition to Cu as part of the electrically conductive coating or as part of any of the plurality of coatings 308. That is, in some embodiments, the one or more electrically conducting elements or compounds may supplement Cu as part of the same or different coating, e.g., for providing the requisite electrical conductivity.

The one or more electrically conducting elements or compounds can greatly reduce or eliminate the need for copper as part of the coating in traditional coated electrode wires. Thus, according to embodiments, the one or more electrically conducting elements or compounds can be present without or in addition to Cu. When present in addition to Cu, the one or more electrically conducting elements are present in an amount exceeding 50 at. %, 60 at. %, 70 at. %, 80 at. %, 90 at. %, or a value in a range defined by any of these values, of a combined sum of the one or more electrically conducting elements or compounds and Cu. Thus reduced Cu content can advantageously reduce the adverse effect of copper cracking of the welds.

When present, Cu is present in an amount exceeding 0.0005 wt. %, 0.0010 wt. %, 0.0020 wt. %, 0.0050 wt. %, 0.010 wt. %, 0.020 wt. %, 0.050 wt. %, 0.10 wt. %, 0.20 wt. %, 0.5 wt. %, or a value in a range defined by any of these values, of the weight of the welding wire.

Additional Functional Coating

According to various embodiments, any one of the first, second and third coatings 308A, 308B, 308C (FIGS. 4A or 4B) is an additional functional coating comprising a molten weld metal surface tension modifier, as described below.

Various productivity parameters such as the travel speed for forming the weld metal can be determined in part by the surface tension of the molten droplet of the weld metal. To provide a desired molten weld metal surface tension, according to some embodiments, the additional functional coating includes a molten weld metal surface tension modifier. The molten weld metal surface tension modifier includes one or more additional elements or compounds adapted to modify the surface tension of the molten droplet of the weld metal formed from the welding electrode 400A, 400B. According to various embodiments, the one or more additional elements or compounds adapted to modify the surface tension are selected from the group consisting of cadmium (Cd), mercury (Hg), gallium (Ga), indium (In), germanium (Ge), tin (Sn), lead (Pb), phosphorous (P), arsenic (As), antimony (Sb), bismuth (Bi), sulfur (S), selenium (Se), tellurium (Te) and polonium (Po).

The one or more additional elements or compounds adapted to modify the surface tension of the molten weld metal can modify, e.g. reduce, the surface tension of the molten weld metal droplets such the molten droplets separate from the electrode at a faster rate relative to metal droplets formed from a reference electrode without the one or more additional elements or compounds adapted to modify the surface tension of the molten weld metal. The size of the droplet can be related to the equilibrium contact angle of the droplet formed on the solidified weld metal or workpiece, as defined by a relationship known as the Young-Dupré equation. If the solid-vapor interfacial energy between the molten weld metal is denoted by ysG, the solid-liquid interfacial energy by $\gamma_{SL}$, and the liquid-vapor interfacial energy (i.e. the surface tension) by $\gamma_{LG}$, then the equilibrium contact angle $\theta_C$ is determined from these quantities by the Young-Dupré equation:

$$\gamma_{SG} - \gamma_{SL} - \gamma_{LG} \times \cos \theta_C = 0$$

In other words, the contact angle is established by the balance of the adhesive force (the liquid wanting to maintain contact with the solid) and the cohesive force within the liquid (both the internal cohesive force and the force of surface tension). An increase in adhesive force between the liquid and the solid or a decrease in the cohesive force (surface tension) within the liquid will result in greater wettability and a smaller contact angle. For greater travel speed, a lower surface tension may be favorable because of the reduction in droplet size as well as improved wettability of the workpiece or solidified weld metal by the molten weld metal. For example, an average droplet size formed from electrodes according to embodiments can be reduced by 30%, 40%, 50%, 60%, or a value in a range defined by any of these values with the addition of these elements. The surface tension of the molten droplet formed from the welding electrode is reduced by 10%, 20%, 30%, 40%, 50% or more, relative to a reference molten droplet formed under the same welding conditions from a reference welding electrode that is the same as the welding electrode except for the presence of the surface tension modifying elements. The average droplet size and the surface tension can be reduced such that a travel speed for forming a weld metal using welding electrodes according to embodiments can be higher by 30%, 40%, 50%, 60% or more relative to a travel speed for forming a weld metal without using welding electrodes without the one or more additional elements or compounds adapted to modify the surface tension of the molten weld.

The inventors have found that the one or more additional elements or compounds adapted to modify the surface tension of the molten weld metal can synergistically and simultaneously reduce the amount of slag or residual oxide or silicate islands that form on the weld metal. The oxide islands can be difficult to remove and deteriorate the visual appearance of the weld metal. The relative ease of oxide or silicate island removal can be related to the equilibrium contact angle of the oxide or silicate islands formed on the weld metal, as defined by a relationship known as the Young-Dupré equation. If the solid-vapor interfacial energy is denoted by $\gamma_{SG}$, the solid-liquid interfacial energy by $\gamma_{SL}$, and the liquid-vapor interfacial energy (i.e. the surface tension) by $\gamma_{LG}$, then the equilibrium contact angle $\theta_C$ is determined from these quantities also by the Young-Dupré equation defined above. That is, while the same equation may be applicable, the relevant interface is that between the silicate island and the weld metal underneath.

According to embodiments, the one or more additional elements or compounds adapted to modify the surface tension of the molten weld metal are present in an amount and form such that a volume of silica islands formed on a weld metal formed from the welding wire is lower by at least 30%, 40%, 50%, 60% or more relative to a volume of silica islands formed on a weld metal formed from the core wire without the one or more additional elements or compounds adapted to modify the surface tension of the molten weld.

According to various embodiments, each of the one or more electrically conducting elements or compounds and the additional elements or compounds is present in an amount of exceeding 0.0005 wt. %, 0.0010 wt. %, 0.0020 wt. %, 0.0050 wt. %, 0.010 wt. %, 0.020 wt. %, 0.050 wt. %, 0.10 wt. %, 0.20 wt. %, 0.5 wt. %, 1.0 wt. %, 2.0 wt. %, 5.0 wt. %, or a value in a range defined by any of these values, of the weight of the welding wire.

Thus, the welding wire comprises a core wire having a Fe-based or steel composition, e.g., a mild steel composition, that includes Fe and one or more of C, Mn, Si, Ni, Mo, Cr and V, one or more electrically conducting elements or compounds, and the additional elements or compounds at concentrations greater than impurity levels. The core wire herein refers to a solid wire having substantially homogenous composition.

Referring to FIG. 4B, in some embodiments, two of the first, second and third coatings 308A, 308B and 308C are configured as electrically conductive coatings. For example, the first and third coatings 308A and 308C may be the same or different electrically conductive coatings, and may be interposed by the second coating 308B arranged as the additional functional coating.

Still referring to FIG. 4B, in some other embodiments, two of the first, second and third coatings 308A, 308B and 308C are configured as additional functional coatings. For example, the first and third coatings 308A and 308C may be the same or different additional functional coatings, and may be interposed by the second coating 308B arranged as the electrically conductive coating.

Referring to FIG. 3 and FIGS. 4A-4B, according to various embodiments, the core wire 304 can have a diameter of ⅟₁₆ in. (1.6 mm), ³⁄₃₂ in. (2.5 mm), ⅛ in. (3.2 mm), ⁵⁄₃₂ in. (4.0 mm), ³⁄₁₆ in. (5.0 mm), or a diameter in a range defined by any of these values, for instance 3.2 mm. The core wire 304 may have a length of 250 mm, 300 mm, 350 mm 400 mm, 450 mm, 500 mm, or a length in a range defined by any of these values. The coating 308 can have a thickness of 1-1.5 mm, 1.5-2.0 mm, 2.0-2.5 mm, 2.5-3.0 mm, or a thickness in a range defined by any of these values, for instance 1.2 mm. By way of examples only, an electrode having a core wire diameter of 3.2 mm and a coating thickness of 1.2 mm can have an overall diameter of 5.6 mm; and an electrode having a core wire diameter of 4.0 mm and a coating thickness of 1.35 mm can have an overall diameter of 6.7 mm. According to various embodiments, the coating 308 can have a weight percentage, on the basis of a total weight of the electrode 300, of 10-15%, 15-20%, 20-25%, 25-30%, 30-35%, 35-40%, or a value in a range defined by any of these values.

In particular embodiments, the additional functional coating 308B is formed on an electrically conductive coating 308A. When the additional functional coating 308B includes the molten weld metal surface tension modifier, it includes one or both of elemental antimony (Sb) and one or more Sb oxides. The one or more Sb oxides can be present in the form of one or more of diantimony tetroxide ($Sb_2O_4$), antimony trioxide, ($Sb_2O_3$), antimony pentoxide ($Sb_2O_5$), antimony hexitatridecoxide ($Sb_6O_{13}$) and stibiconite ($Sb_3O_6(OH)$). Substoichiometric oxides of these oxides are also possible.

The inventors have discovered that it can be particularly advantageous to form the additional functional coating 308B including Sb by an electrochemical deposition technique for various reasons described herein. The electrode structure described herein including a solid core wire coated with two or more functional coatings is particularly advantageous for electrodeposition, because the underlying solid core wire 304 or the electrically conductive coating 308A can serve as an effective electrode for the relevant electrochemical reaction. This is in contrast to electrodes in which the core may be discontinuous or insufficiently electrically conducting, e.g., when the core is formed of a powder, e.g., in metal-cored electrode.

The inventors have further discovered that it can be particularly advantageous to form the additional functional coating 308B including Sb by electrochemical deposition, because it can provide a high degree of control over the composition, at both macroscopic and microscopic levels. In particular, electrodeposition allows formation of one or both of elemental antimony (Sb) and one or more Sb oxides. In one particular example, by way of example, the additional functional coating including particles of Sb and one or more Sb oxides can be deposited by galvanostatic reduction of antimonyl tartrate. Using such electrodeposition techniques, composite films including one or both of elemental antimony (Sb) and/or one or more Sb oxides can be formed. The relative amounts of Sb and/or Sb oxides can be controlled such that the overall composition of the resulting Sb/Sb oxide mixture can have an Sb:O ratio of 0.1, 0.2, 0.5, 1, 2, 5, 10, or a value in a range defined by any of these values.

In some embodiments the resulting film can be a homogeneous mixture of elemental Sb and Sb oxides. In some other embodiments, the resulting additional functional coating 308B can include islands, domains, grains or particles that can include elemental Sb and/or any one or more of Sb oxides. By way of one example, the relative amounts of elemental Sb and Sb oxides, e.g., relative amounts of elemental Sb particles and Sb oxide particles, can be controlled by controlling the local pH at the electrode/electrolyte interface. An intermediate product of the welding electrode having the solid core wire coated with an electrically conductive coating, e.g., Cu coating, can serve as the electrode in these electrochemical reactions. Without being bound to any theory, while Sb is thermodynamically stable at low pH, the formation of $Sb_2O_3$ is favored at higher pH values. Thus, by controlling the pH at the electrode/electrolyte interface, the additional functional coating can have controlled amounts of particles of Sb and particles of one or more Sb oxides. Further, depending on the initial pH of the pH at the electrode/electrolyte interface, the additional functional coating 308B can be controlled to have the initial nucleation layer that is predominantly or richer in one or the other of the elemental Sb and Sb oxides. Using these and other approaches, the weight ratio of elemental Sb particles to Sb oxide particles can be controlled to be 0.1, 0.2, 0.3, 0.4, 0.5, 0.6, 0.7, 0.8, 0.9 or a value in a range defined by any of these values.

The inventors have further discovered that it can be particularly advantageous to form the additional functional coating 308B including Sb by electrochemical deposition, which provides control over the morphology of the additional functional coating. In particular, the inventors have discovered that it can be advantageous to form the coating with sub-micron particles, which can provide a high degree of control over the morphology of the resulting coating, at both macroscopic and microscopic levels. By controlling the surface condition of the underlying conductive coating, e.g., a Cu coating formed on the solid core wire, the density of nucleation can be controlled in electrochemical deposition of elemental Sb and Sb oxides. For example, by providing a rougher underlying surface, higher density of nuclei can be attained, leading to smaller average size of the islands, domains, grains or particles. The average size of the islands, domains, grains or particles can be less than 1000 nm, 800 nm, 600 nm, 400 nm, 200 nm, 100 nm, 50 nm, 20 nm, 10 nm, or be a value in a range defined by any of these values.

The islands, domains, grains or particles can have controlled shape and average size and size distribution such that resulting additional functional coating 308B has a controlled porosity. The controlled porosity can be advantageous for a variety of reasons, including physical appearance, improved adhesion with an overlying coating and controlled exposure of the underlying material, to name a few. For example, the porosity, defined as the ratio of empty volume to the overall volume of the coating, can be controlled to be 0.1, 0.2, 0.3, 0.4, 0.5 or a value in a range defined by any of these values.

In addition, in some embodiments, the additional functional coating 308B can be discontinuous, patchy or otherwise formed to partly cover the underlying solid core wire 304 or the electrically conductive coating 308A. Partial coverage may be beneficial under some circumstances, e.g., to optimize the surface friction and travel speed of the welding wire. For example, when the underlying electrically conductive coating 308A such as Cu coating has substantially lower friction, it may be desirable to partly expose the electrically conductive coating 308A. The surface coverage ratio, defined as the ratio of a surface area of the underlying material (e.g., the electrically conductive coating 308A) covered by the additional functional coating 308B to the overall surface area of the underlying material, can be controlled to be 0.1, 0.2, 0.3, 0.4, 0.5 or a value in a range defined by any of these values.

The inventors have discovered that, to improve the surface tension-reducing effects of Sb while reducing the likelihood of Sb having detrimental impact on the mechanical properties of the resulting weld metal, it can be advantageous to configure the welding wire such that controlled amounts of Sb becomes part of the weld metal. According to embodiments, the amount of Sb in the welding electrode that becomes alloyed with the weld metal can be less than 60%, 50%, 40%, 30%, 20% of the total amount of Sb present in the welding wire, for instance 25-60% of the total amount of Sb present in the welding wire. The relatively small amount of Sb that is incorporated into the weld metal can be attributed to various features of the additional functional coating 308B described above, including the presence of both elemental Sb and Sb oxides, which may be enabled by the electrochemical deposition. The varying amount of Sb can be volatilized, e.g., by controlling the ratio of elemental Sb to oxide of Sb. TABLE 1 below illustrates experimental atomic % of Sb in the experimentally manufactured welding wire and the detected atomic % of Sb in the resulting weld metal. As illustrated, 0.009-0.024% of Sb in the welding wire results in 0.004-0.010% of Sb in the resulting welding metal.

TABLE 1

| Sample | Wire Chemistry (Inductively Coupled Plasma Mass Spectrometry (ICP-MS)) | | | Weld Metal Chemistry (ICP-MS) |
|--------|---------|---------|---------|---------|
| ID | Sb (%) | Cu (%) | P (%) | Sb (%) |
| 1 | 0.005 | 0.256 | 0.007 | |
| 2 | 0.006 | 0.261 | 0.008 | |
| 3 | 0.005 | 0.237 | 0.01 | |
| 4 | 0.026 | 0.242 | 0.015 | |
| 5 | 0.018 | 0.259 | 0.013 | |
| 6 | 0.012 | 0.223 | 0.012 | |
| 7 | 0.011 | 0.261 | 0.010 | |
| 8 | 0.028 | 0.228 | 0.018 | |
| 9 | 0.028 | 0.249 | 0.015 | |
| 10 | 0.007 | 0.102 | 0.006 | |
| 11 | 0.003 | 0.111 | 0.005 | |
| 12 | 0.006 | 0.118 | 0.005 | |
| 13 | 0.017 | 0.187 | 0.017 | |
| 14 | 0.024 | 0.153 | 0.031 | 0.007 |
| 15 | 0.013 | 0.150 | 0.012 | 0.006 |
| 16 | 0.016 | 0.164 | 0.013 | 0.008 |
| 17 | 0.016 | 0.118 | 0.012 | 0.005 |
| 18 | 0.012 | 0.127 | 0.011 | 0.005 |
| 19 | 0.016 | 0.116 | 0.012 | 0.004 |
| 20 | 0.009 | 0.011 | 0.014 | 0.006 |
| 21 | 0.014 | 0.010 | 0.014 | 0.009 |
| 22 | 0.017 | 0.010 | 0.016 | 0.010 |
| 23 | 0.018 | 0.15 | 0.015 | |
| 24 | 0.014 | 0.16 | 0.014 | |
| 25 | 0.025 | 0.15 | 0.018 | |
| 26 | 0.008 | 0.13 | 0.007 | |
| 27 | 0.007 | 0.12 | 0.007 | |
| 28 | 0.006 | 0.125 | 0.007 | |
| 29 | 0.001 | 0.01 | 0.011 | |
| 30 | 0.015 | 0.01 | 0.013 | |
| 31 | 0.02 | 0.015 | 0.01 | |

Method of Manufacturing Coated Electrodes

FIG. 5 illustrates a method 500 of forming two or more coatings on a core wire according to embodiments. The method 500 includes providing 510 a core wire 304 (FIGS. 4A, 4B) having a base metal composition and conditioning

520 the surface of the core wire in preparation for forming the two or more coatings. The method 500 includes forming 530 a first coating 308A (FIGS. 4A, 4B) comprising one of an electrically conductive coating, including one or more electrically conducting elements or compounds in addition to or other than copper (Cu), and an additional functional coating. After forming 530 the first coating 308A, the method 500 proceeds to post-conditioning 540 the surface of the first coating 308A. The method 500 additionally includes forming 550 the second coating 308B (FIGS. 4A, 4B) comprising the other of the electrically conductive coating and the additional functional coating. After forming 550 the second coating 308B, the method 500 proceeds to post-conditioning 560 the surface of the second coating 308B.

In some embodiments, the method 500 optionally proceeds to form 540 a third coating 308C (FIG. 4B). In some embodiments, the third coating 308C can be a second electrically conductive coating including one or more electrically conducting elements or compounds in addition to or other than copper (Cu). In some other embodiments, the third coating 308C can be a second additional functional coating different from the first functional coating.

As described above, any one of the first and second coatings 308A, 308B of the electrode 400A (FIG. 4A) or any one of the first, second and third coatings 308A, 308B and 308C of the electrode 400B (FIG. 4B) can be arranged as either an electrically conductive coating or an additional functional coating, in any order.

The method 500 may be carried out in a production line including a loading station for providing 510 the core wire, a surface conditioning station for conditioning 520 the core wire, a drawing station, a first coating station for forming 530 the first coating, a first post-conditioning station for post-conditioning 540 the surface of the first coating, a second coating station for forming 550 the second coating, a second post-conditioning station for post-conditioning 560 the surface of the second coating, a third coating station for forming 570 the third coating, and a third post-conditioning station for post-conditioning 580 the surface of the third coating.

Providing 510 the core wire comprises providing the core wire 304 (FIGS. 3, 4A-4B) comprising the base metal composition described above, e.g., a steel composition such as a mild steel composition. Conditioning 520 the surface of the core wire includes cleaning the surface thereof at a cleaning station. In one exemplary embodiment, the cleaning station uses a cleansing and/or coating agent to clean the outer surface of the material.

After cleaning, the material moves to a drawing station. The drawing station includes at least one die. In one exemplary embodiment, the drawing station includes a series of dies, with each die having a successively smaller opening than the previous die. A lubricant (e.g., a powder lubricant) may be added to the dies to facilitate passage of the core wire through the dies and to reduce wear on the dies. As the core wire passes through the drawing station, a diameter of the material may be progressively reduced by plastic deformation to a desired dimension. In some embodiments, the drawing process uses a drawing soap, which can be a stearate, e.g., a calcium stearate, sodium stearate, etc. These soaps assist in the drawing process. After the drawing step, the core wire may further go through an acid tank to further clean the incoming core wire and prepare for forming one or more coatings thereon. After the cleaning, the desired Ca range on the wire will be such that the wire can be further used for coating. The Ca content can vary from 0.0005 wt % to 1 wt % of the wire to form an optimized surface for further coating.

After conditioning 520 the surface of the core wire, the method 500 proceeds to form 530 a first coating 308A (FIGS. 4A, 4B) comprising one of an electrically conductive coating, including one or more electrically conducting elements or compounds in addition to or other than copper (Cu), and an additional functional coating, e.g., an Sb-containing coating describe herein.

In various embodiments, forming 530 the first coating comprises wet coating, e.g., in a wire plating tank which includes the desired coating recipe. The wet coating process can be carried out via chemical/electrochemical or mechanical/physical processes. The chemical process can be a displacement reaction, sol-gel thin-film process, electroplating or electroless plating, to name a few examples. In the mechanical/physical process, the coating is adhered to the wire surface using a binder.

After forming 530 the first coating 308A, the method 500 proceeds to post-conditioning 540 the surface of the first coating 308A. In some examples, post-conditioning 540 includes curing using, e.g., inline heating. The inline heating is achieved either by conduction, convection, radiation, or joule heating, etc. The heating can be electrical/resistive heating, induction heating, heating by flame or hot air, LASER heating, plasma heating, etc.

The method 500 additionally includes forming 550 the second coating 308B (FIGS. 4A, 4B) comprising the other of the electrically conductive coating and the additional functional coating. In various embodiments, forming 550 the second coating comprises wet coating, e.g., in a wire plating tank which includes the desired coating recipe. The wet coating process can be carried out via chemical/electrochemical or mechanical/physical processes. The chemical process can be a displacement reaction, sol-gel thin-film process, electroplating or electroless plating, to name a few examples. In the mechanical/physical process, the coating is adhered to the wire surface using a binder.

When present, the method 500 includes forming additional coating(s) 308C (FIG. 4B), which process can be similar to forming 530, 550 the first and/or second coating 308A, 308B.

It will be appreciated that, in some implementations, one or both of the electrically conductive coating and the additional functional coating comprise a plurality of pores, wherein the pores are at least partly filled with a material different from the electrically conductive coating and the additional functional coating having the pores. When present, having the porous structure can be advantageous for improving adhesion between different layers.

After forming 550 the second coating 308B, the method 500 proceeds to post-conditioning 560 the surface of the second coating 308B. In some embodiments, post-conditioning 560 includes passing through a finish/polishing die. When the final coating comprises a metallic coating such as a Cu coating, the polishing die smoothens the wire surface, removes excess copper and makes the wire look uniform and shiny, among other effects. The die can be a polycrystalline diamond die or a tungsten carbide die.

FIG. 6A illustrates a weld metal formed using a conventional consumable electrode. FIG. 6B illustrates a weld metal formed using a consumable electrode having functional coatings according to embodiments. The two consumable electrodes used to form the weld metals in FIGS. 6A and 6B have identical composition, except for the functional coatings. In particular, the weld metal shown in FIG. 6B was formed using an electrode having an electrically conductive coating including one or more electrically conducting elements including copper (Cu) and an additional functional coating formed on the electrically conductive coating and including elemental antimony (Sb) and one or more Sb oxides. As described above with respect to FIG. 4A, the weld metal formed using the consumable electrode according to embodiments has a dramatically reduced amount of silicate islands, due to an increased contact angle between the silicate islands and the weld metal.

Unless the context clearly requires otherwise, throughout the description and the claims, the words "comprise," "comprising," "include," "including" and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number, respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or whether these features, elements and/or states are included or are to be performed in any particular embodiment.

While certain embodiments have been described, these embodiments have been presented by way of example only, and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. Each of these blocks may be implemented in a variety of different ways. Any suitable combination of the elements and acts of the various embodiments described above can be combined to provide further embodiments. The various features and processes described above may be implemented independently of one another, or may be combined in various ways. All possible combinations and subcombinations of features of this disclosure are intended to fall within the scope of this disclosure.

15

What is claimed is:

1. A welding electrode, comprising:
a solid core wire having an iron (Fe)-based base metal composition;
an electrically conductive coating formed on the solid core wire and including one or more electrically conducting elements or compounds in addition to or other than copper (Cu), and
an additional functional coating formed on the electrically conductive coating and including one or both of elemental antimony (Sb) and one or more Sb oxides, wherein the additional functional coating comprises sub-micron particles comprising the elemental Sb and the one or more Sb oxides, and wherein the additional functional coating is a porous layer comprising a plurality of pores formed between adjacent particles of the sub-micron particles.

2. The welding electrode of claim 1, wherein a total amount of Sb in the welding electrode is effective to reduce a surface tension of a molten droplet formed from the welding electrode by 10% or more, relative to a reference molten droplet formed under the same welding conditions from a reference welding electrode that is the same as the welding electrode except for the presence of Sb.

3. The welding electrode of claim 2, wherein the welding electrode is configured for forming a weld metal at a travel speed that is higher by 30% or more relative to a travel speed for forming a reference weld metal under the same welding conditions using the reference welding electrode that is the same as the welding electrode except for the presence of Sb or one or more Sb oxides.

4. The welding electrode of claim 2, wherein the total amount of Sb is 0.0005-2 weight %.

5. The welding electrode of claim 4, wherein the welding electrode is configured such that a weld metal formed using the welding electrode incorporates therein 25-60% of the total amount of Sb.

6. The welding electrode of claim 1, wherein the sub-micron particles comprise elemental Sb particles and $Sb_2O_3$ particles.

7. The welding electrode of claim 1, wherein the pores expose the underlying electrically conductive coating.

8. The welding electrode of claim 1, wherein the one or more electrically conducting elements or compounds are selected from the group consisting of magnesium (Mg), aluminum (Al), zinc (Zn), tin (Sn), chromium (Cr), platinum (Pt), silver (Ag), graphite, graphene, graphene oxide and titanium (Ti).

9. The welding electrode of claim 8, wherein the one or more electrically conducting elements or compounds are present in the electrically conductive coating without Cu.

10. The welding electrode of claim 8, wherein the one or more electrically conducting elements or compounds are present in addition to Cu in an amount exceeding 90 atomic % of a combined sum of the one or more electrically conducting elements or compounds and Cu.

11. A welding electrode, comprising:
a solid core wire having an iron (Fe)-based base metal composition; and
two or more coatings covering at least a portion of the solid core wire, wherein the two or more coatings comprise:
an electrically conductive coating formed on the solid core wire including one or more electrically conducting elements or compounds in addition to or other than copper (Cu), and
an additional functional coating including antimony (Sb) and having a porous structure and formed on the electrically conductive coating.

12. The welding electrode of claim 11, wherein a total amount of Sb present in the welding electrode is an amount effective to increase a contact angle of oxide islands formed on a weld metal formed from the welding electrode by 10% or more, relative to a contact angle of reference oxide islands formed on a reference weld metal formed under the same welding conditions and from a reference welding electrode that is the same as the welding electrode except for the presence of Sb.

13. The welding electrode of claim 12, wherein the total amount of Sb is 0.0005-2 weight %.

14. The welding electrode of claim 11, wherein the Sb is in the form of elemental Sb and one or more Sb oxides.

15. The welding electrode of claim 14, wherein the additional functional coating comprises sub-micron particles comprising the elemental Sb and the one or more Sb oxides.

16. The welding electrode of claim 15, wherein the sub-micron particles comprises elemental Sb particles and $Sb_2O_3$ particles.

17. The welding electrode of claim 15 wherein the sub-micron particles partly cover the electrically conductive coating such that portions of the electrically conductive coating are exposed between adjacent ones of the sub-micron particles.

18. The welding electrode of claim 11, wherein the Sb is present in the welding electrode in an amount and form such that a volume of silica islands formed on a weld metal formed from the welding electrode is lower by at least 50% relative to a volume of reference silica islands formed on a reference weld metal formed under the same welding conditions using a reference welding electrode that is the same as the welding electrode except for the presence of Sb.

19. The welding electrode of claim 11, further comprising calcium (Ca) at an interface region between the solid core wire and the two or more coatings in an amount of 0.0005-1 wt. % of a weight of the welding electrode.

* * * * *